United States Patent
Nakamura et al.

(10) Patent No.: US 12,091,026 B2
(45) Date of Patent: Sep. 17, 2024

(54) VEHICLE CONTROL DEVICE, VEHICLE CONTROL SYSTEM, VEHICLE CONTROL METHOD, AND PROGRAM

(71) Applicant: HONDA MOTOR CO., LTD., Tokyo (JP)

(72) Inventors: Yoshifumi Nakamura, Wako (JP); Yuichi Komori, Wako (JP); Shingo Ito, Wako (JP); Ayumu Horiba, Wako (JP); Tadahiko Kanoh, Wako (JP); Noriyuki Imaeda, Tokyo (JP); Takashi Kishimoto, Tokyo (JP); Daiki Higuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/268,628

(22) PCT Filed: Dec. 28, 2020

(86) PCT No.: PCT/JP2020/049108
§ 371 (c)(1),
(2) Date: Jun. 21, 2023

(87) PCT Pub. No.: WO2022/144963
PCT Pub. Date: Jul. 7, 2022

(65) Prior Publication Data
US 2024/0059304 A1    Feb. 22, 2024

(51) Int. Cl.
*B60W 30/06* (2006.01)
*B60W 30/182* (2020.01)
(Continued)

(52) U.S. Cl.
CPC .......... *B60W 50/082* (2013.01); *B60W 30/06* (2013.01); *B60W 30/182* (2013.01);
(Continued)

(58) Field of Classification Search
CPC .. B60W 50/082; B60W 30/06; B60W 30/182; B60W 50/029; B60W 50/14;
(Continued)

(56) References Cited

U.S. PATENT DOCUMENTS 9,195,232 B1 * 11/2015 Egnor ................. G05D 1/0055
10,139,828 B2 * 11/2018 Ho ..................... B60W 50/029
(Continued)

FOREIGN PATENT DOCUMENTS

| CN | 109606385 | 4/2019 |
| CN | 110001649 | 7/2019 |

(Continued)

OTHER PUBLICATIONS

Japanese Decision to Grant a Patent for Japanese Patent Application No. 2022-527934 mailed Dec. 6, 2022.
(Continued)

*Primary Examiner* — Daniel M. Robert
(74) *Attorney, Agent, or Firm* — Amin, Turocy & Watson, LLP

(57) ABSTRACT

A vehicle control device includes a recognizer configured to recognize surrounding circumstances of a vehicle; a driving controller configured to control steering and acceleration/deceleration of the vehicle; and a mode determinator configured to determine any of a plurality of driving modes including a first driving mode and a second driving mode as a driving mode of the vehicle, in which tasks imposed on a driver in the second driving mode are less significant than in the first driving mode, the driving controller controls the vehicle in the second driving mode, and the driving mode is changed to the first driving mode when an abnormality including predetermined conditions has occurred regarding (Continued)

| | CONDITIONS FOR JUDGMENT | ESTIMATED ABNORMALITY |
|---|---|---|
| (1) | FIRST CONTROL DEVICE RECEIVES INFORMATION INDICATING THAT VIDEO IMAGE DATA CANNOT BE OUTPUT FROM MULTIVIEW CAMERA UNIT, AND THIS STATE HAS CONTINUED FOR FIRST TIME (FOR EXAMPLE, 5 [s]) | FAILURE OF MULTIVIEW CAMERA UNIT (INTERNAL FAILURE, OR FLAW OF VIDEO IMAGE SIGNAL) |
| (2) | FIRST CONTROL DEVICE RECEIVES INFORMATION INDICATING THAT VIDEO RECORDING CANNOT BE PERFORMED FROM MULTIVIEW CAMERA UNIT OR MEMORY DEVICE, AND THIS STATE HAS CONTINUED FOR SECOND TIME (FOR EXAMPLE, 18 [s]) | FAILURE OF MULTIVIEW CAMERA UNIT<br><br>FAILURE OF MEMORY DEVICE<br><br>FAILURE OF FIRST CONTROL DEVICE |
| (3) | STATE IN WHICH VIDEO RECORDING IS NOT PERFORMED BY MULTIVIEW CAMERA UNIT OR MEMORY DEVICE HAS CONTINUED FOR THIRD TIME (FOR EXAMPLE, 18 [s]) EVEN THOUGH FIRST CONTROL DEVICE HAS OUTPUT INSTRUCTION FOR VIDEORECORDING OF VIDEO IMAGE DATA | | one or more cameras capturing an image of an area around the vehicle or an image captured by the one or more cameras.

8 Claims, 8 Drawing Sheets

(51) Int. Cl.
  *B60W 50/029* (2012.01)
  *B60W 50/08* (2020.01)
  *B60W 50/14* (2020.01)
  *B60W 60/00* (2020.01)
  *G05D 1/00* (2024.01)
  *G06V 20/56* (2022.01)

(52) U.S. Cl.
  CPC .......... *B60W 50/029* (2013.01); *B60W 50/14* (2013.01); *G06V 20/56* (2022.01); *B60W 2050/146* (2013.01); *B60W 60/005* (2020.02); *B60W 2420/403* (2013.01); *G05D 1/0061* (2013.01)

(58) Field of Classification Search
  CPC ....... B60W 2050/146; B60W 2420/42; B60W 60/005; G06V 20/56; G05D 1/0061
  See application file for complete search history.

(56) References Cited

U.S. PATENT DOCUMENTS

| | | | |
|---|---|---|---|
| 2018/0093663 A1* | 4/2018 | Kim | G08G 1/166 |
| 2018/0339712 A1* | 11/2018 | Kislovskiy | H04L 67/34 |
| 2019/0202468 A1 | 7/2019 | Kaji et al. | |
| 2019/0375381 A1* | 12/2019 | Nakagawa | B60K 35/00 |
| 2020/0039508 A1 | 2/2020 | Onishi | |
| 2020/0043254 A1 | 2/2020 | Hase et al. | |
| 2020/0104604 A1 | 4/2020 | Yoshikawa | |
| 2020/0290601 A1* | 9/2020 | Yamanaka | B60W 10/20 |
| 2020/0298727 A1 | 9/2020 | Ukai et al. | |
| 2020/0302787 A1* | 9/2020 | Namba | G08G 1/0141 |
| 2020/0353941 A1 | 11/2020 | Wang et al. | |
| 2021/0116256 A1* | 4/2021 | Konrardy | B60R 25/31 |
| 2021/0284140 A1* | 9/2021 | Hayakawa | G06V 20/56 |
| 2021/0300392 A1* | 9/2021 | Shionome | B60W 10/20 |
| 2022/0126865 A1* | 4/2022 | Marcotte | B60W 50/082 |
| 2024/0059304 A1* | 2/2024 | Nakamura | G08G 1/00 |

FOREIGN PATENT DOCUMENTS

| | | |
|---|---|---|
| DE | 112016007454 | 8/2019 |
| JP | 6035032 | 11/2016 |
| JP | 2018-180843 | 11/2018 |
| JP | 2020-051942 | 4/2020 |
| JP | 2020-055410 | 4/2020 |
| JP | 2020-152139 | 9/2020 |
| JP | 2020-154624 | 9/2020 |
| JP | 2020-184302 | 11/2020 |

OTHER PUBLICATIONS

International Search Report and Written Opinion for International Application No. PCT/JP2020/049108 mailed on Mar. 23, 2021, 8 pages.
Japanese Office Action for Japanese Patent Application No. 2022-527934 mailed Aug. 30, 2022.
Japanese Decision to Grant a Patent for Japanese Patent Application No. 2022-527934 mailed Dec. 20, 2022.
Chinese Office Action for Chinese Patent Application No. 202080107873.6 mailed Oct. 12, 2023.

* cited by examiner

FIG. 2

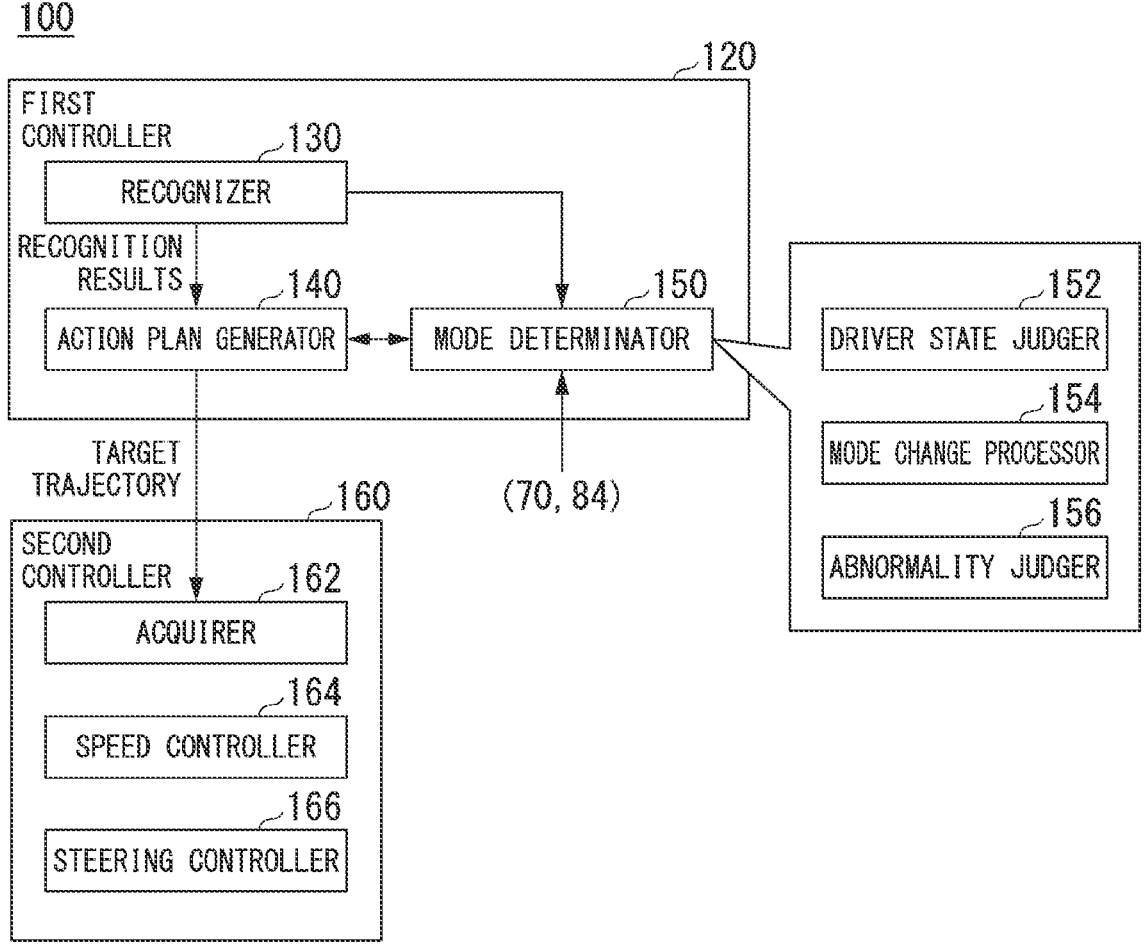

FIG. 3

| DRIVING MODE | CONTROL STATE | TASK |
|---|---|---|
| MODE A | AUTOMATED DRIVING | FRONT SIDE MONITORING:NOT REQUIRED STEERING WHEEL GRASPING: NOT REQUIRED |
| MODE B | AUTOMATED DRIVING | FRONT SIDE MONITORING:REQUIRED STEERING WHEEL GRASPING: NOT REQUIRED |
| MODE C | AUTOMATED DRIVING | FRONT SIDE MONITORING:REQUIRED STEERING WHEEL GRASPING:REQUIRED |
| MODE D | DRIVING ASSISTANCE | AT LEAST DRIVING OPERATION TO CERTAIN EXTENT IS REQUIRED |
| MODE E | MANUAL DRIVING | DRIVING OPERATION IS REQUIRED TOGETHER WITH STEERING AND ACCELERATION/DECELERATION |

↑ TASK: LESS SIGNIFICANT

↓ TASK: MORE SIGNIFICANT

FIG. 5

FIG. 6

| | CONDITIONS FOR JUDGMENT | ESTIMATED ABNORMALITY |
|---|---|---|
| (1) | FIRST CONTROL DEVICE RECEIVES INFORMATION INDICATING THAT VIDEO IMAGE DATA CANNOT BE OUTPUT FROM MULTIVIEW CAMERA UNIT, AND THIS STATE HAS CONTINUED FOR FIRST TIME (FOR EXAMPLE, 5 [s]) | FAILURE OF MULTIVIEW CAMERA UNIT (INTERNAL FAILURE, OR FLAW OF VIDEO IMAGE SIGNAL) |
| (2) | FIRST CONTROL DEVICE RECEIVES INFORMATION INDICATING THAT VIDEO RECORDING CANNOT BE PERFORMED FROM MULTIVIEW CAMERA UNIT OR MEMORY DEVICE, AND THIS STATE HAS CONTINUED FOR SECOND TIME (FOR EXAMPLE, 18 [s]) | FAILURE OF MULTIVIEW CAMERA UNIT<br><br>FAILURE OF MEMORY DEVICE<br><br>FAILURE OF FIRST CONTROL DEVICE |
| (3) | STATE IN WHICH VIDEO RECORDING IS NOT PERFORMED BY MULTIVIEW CAMERA UNIT OR MEMORY DEVICE HAS CONTINUED FOR THIRD TIME (FOR EXAMPLE, 18 [s]) EVEN THOUGH FIRST CONTROL DEVICE HAS OUTPUT INSTRUCTION FOR VIDEORECORDING OF VIDEO IMAGE DATA | |

FIG. 7

| | CONDITIONS FOR STARTING JUDGMENT |
|---|---|
| (1), (2), (3) | FOLLOWING (a), (b), (c), AND (d) ARE SATISFIED<br>(a) IGNITION SWITCH IS IN ON-STATE<br>(b) VOLTAGE OF FIRST BATTERY IS EQUAL TO OR HIGHER THAN FIRST VOLTAGE (10 [V])<br>(c) SETTING FOR RECORDING VIDEO IMAGES OF MULTIVIEW CAMERA UNIT IS EFFECTIVE<br>(d) FIRST CONTROL DEVICE AND MULTIVIEW CAMERA UNIT ARE IN STATE IN WHICH COMMUNICATION CAN BE PERFORMED THEREBETWEEN |

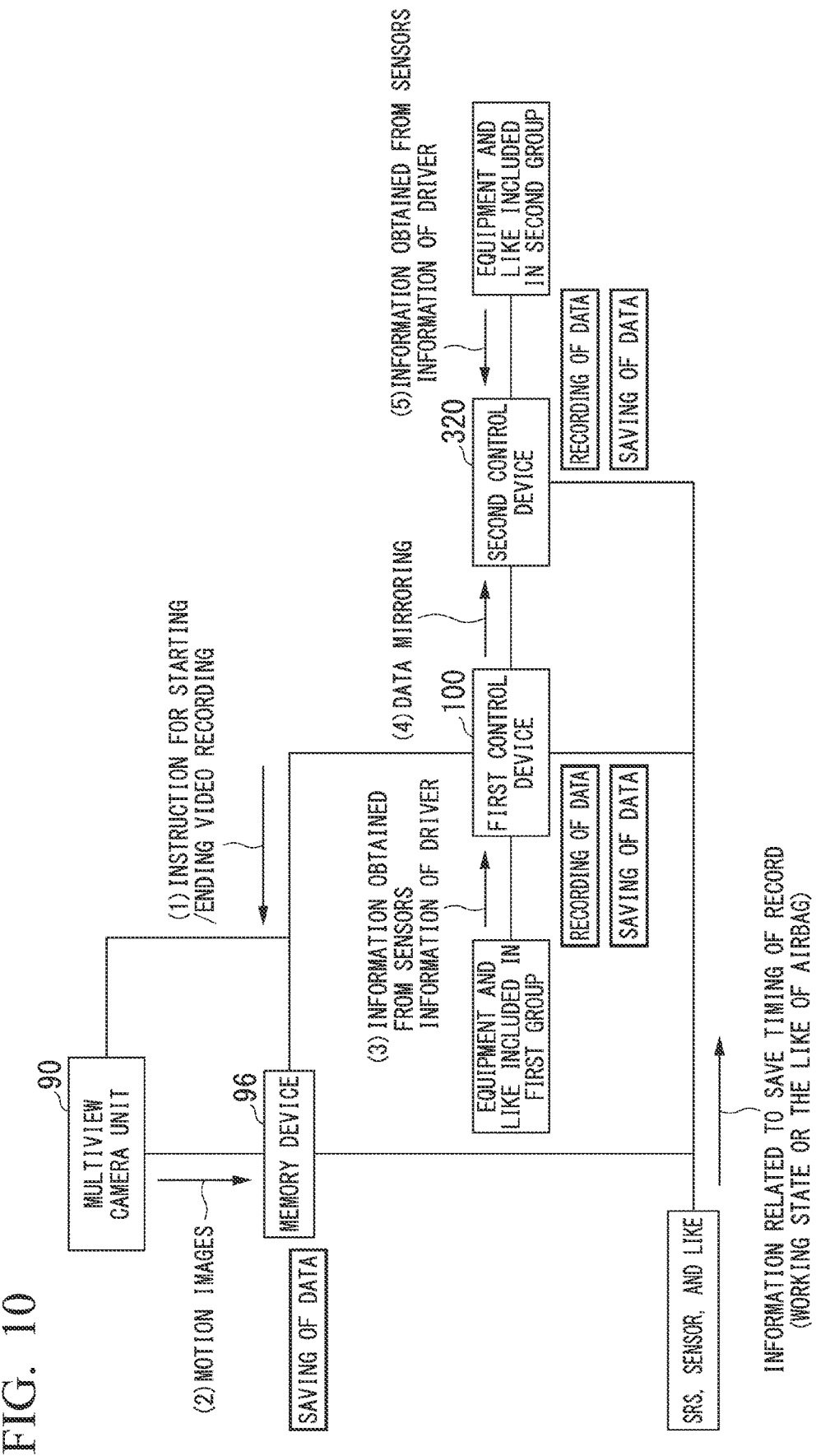

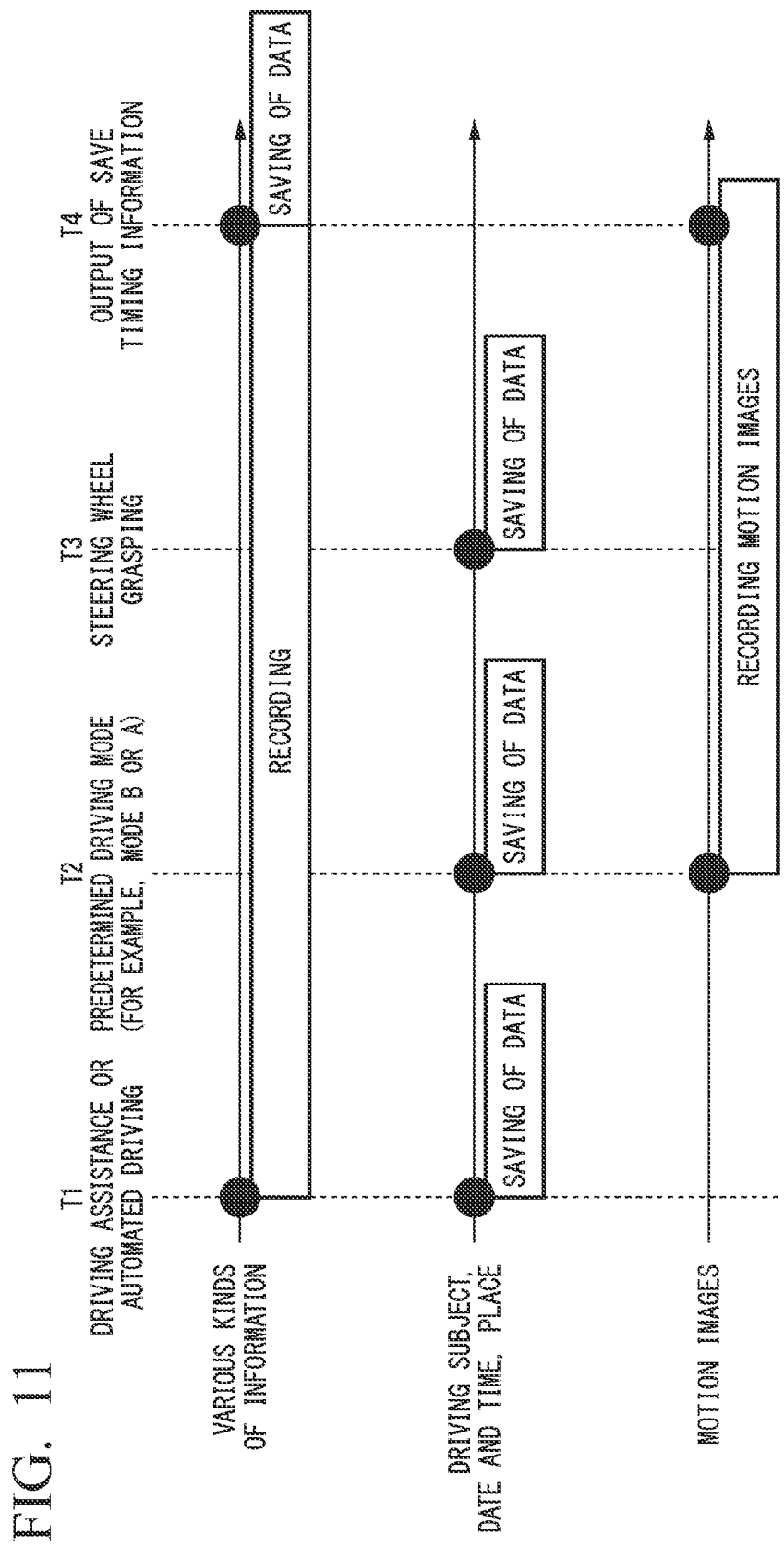

VEHICLE CONTROL DEVICE, VEHICLE CONTROL SYSTEM, VEHICLE CONTROL METHOD, AND PROGRAM

TECHNICAL FIELD

The present invention relates to a vehicle control device, a vehicle control system, a vehicle control method, and a program.

BACKGROUND ART

In the related art, a vehicle having a drive recorder, which captures images of areas around the vehicle using a built-in camera and records the obtained captured images, mounted therein is disclosed (refer to Patent Document 1).

CITATION LIST

Patent Document

Patent Document 1

Japanese Patent No. 6035032

SUMMARY OF INVENTION

Technical Problem

However, in technologies in the related art, capturing images with a camera used for a purpose different from that of a drive recorder, or a relationship between image capturing and controlling of steering and acceleration/deceleration of a vehicle performed by a controller are not taken into consideration.

The present invention has been made in consideration of such circumstances, and an object thereof is to provide a vehicle control device capable of more appropriately controlling a vehicle in accordance with a state of the vehicle, a vehicle control system, a vehicle control method, and a program.

Solution to Problem

A vehicle control device according to this invention employs the following constitutions.

(1): According to an aspect of this invention, there is provided a vehicle control device including a recognizer configured to recognize surrounding circumstances of a vehicle; a driving controller configured to control steering and acceleration/deceleration of the vehicle; and a mode determinator configured to determine any of a plurality of driving modes including a first driving mode and a second driving mode as a driving mode of the vehicle, in which tasks imposed on a driver in the second driving mode are less significant than in the first driving mode, the driving controller controls the vehicle in the second driving mode, and the driving mode is changed to the first driving mode when an abnormality including predetermined conditions has occurred regarding one or more cameras capturing an image of an area around the vehicle or an image captured by the one or more cameras.

(2): According to the aspect of the foregoing (1), the image is an image in which an external situation of the vehicle is captured when the vehicle is controlled in at least the second driving mode, and the image is stored in a storage device as a record of surrounding circumstances of the vehicle.

(3): According to the aspect of the foregoing (1) or (2), the second driving mode is a mode in which a task of monitoring an area around the vehicle and a task of grasping a steering wheel are not imposed on the driver. The first driving mode is a mode in which the vehicle is controlled by a driving operation of the driver.

(4): According to any of the aspects of the foregoing (1) to (3), the cameras include a camera capturing an image of a side in front of the vehicle, a camera capturing an image of a side behind the vehicle, a camera capturing an image in a right direction of the vehicle, and a camera capturing an image in a left direction of the vehicle.

(5): According to any of the aspects of the foregoing (1) to (4), the abnormality is that a state in which the driving controller is not able to acquire the image has continued for a first time, a state in which a device video recording the image is not able to video-record the image has continued for a second time, or a state in which the device does not perform video recording has continued for a third time when the driving controller instructs the device to perform video recording.

(6): According to the aspect of the foregoing (5), the second time or the third time is longer than the first time.

(7): According to any of the aspects of the foregoing (1) to (6), the mode determinator judges whether or not the abnormality including predetermined conditions regarding the one or more cameras or an image captured by the one or more cameras is present when a voltage of a battery mounted in the vehicle is a first voltage or higher and setting for video recording the image is effective in a case in which a system of the vehicle has shifted from a halt state to an activation state.

(8): According to any of the aspects of the foregoing (1) to (7), the vehicle control device further includes an automated parking controller configured to assist automated parking of the vehicle in a predetermined parking space by controlling steering of the vehicle. The image is displayed in a display when the automated parking controller performs the automated parking of the vehicle.

(9): According to another aspect of this invention, there is provided a vehicle control system including one or more first cameras configured to capture an image of an area around a vehicle; a second camera configured to capture an image of an area around the vehicle; a recognizer configured to recognize surrounding circumstances of the vehicle using at least an image captured by the second camera but without using images captured by the first cameras; a driving controller configured to control steering and acceleration/deceleration of the vehicle; and a mode determinator configured to determine any of a plurality of driving modes including a first driving mode and a second driving mode as a driving mode of the vehicle, in which tasks imposed on a driver in the second driving mode are less significant than in the first driving mode, the driving controller controls the vehicle in the second driving mode, and the driving mode is changed to the first driving mode when an abnormality including predetermined conditions has occurred regarding the one or more first cameras or an image captured by the one or more first cameras.

(10): According to another aspect of this invention, there is provided a vehicle control method in which a computer mounted in a vehicle recognizes surrounding circumstances of the vehicle; controls steering and acceleration/deceleration of the vehicle; and determines any of a plurality of driving modes including a first driving mode and a second driving mode as a driving mode of the vehicle, in which tasks imposed on a driver in the second driving mode are less significant than in the first driving mode, the vehicle is controlled in the second driving mode, and the driving mode is changed to the first driving mode when an abnormality including predetermined conditions has occurred regarding one or more cameras capturing an image of an area around the vehicle or an image captured by the one or more cameras.

(11): According to another aspect of this invention, there is provided a program causing a computer mounted in a vehicle to recognize surrounding circumstances of the vehicle; to control steering and acceleration/deceleration of the vehicle; to determine any of a plurality of driving modes including a first driving mode and a second driving mode as a driving mode of the vehicle, in which tasks imposed on a driver in the second driving mode are less significant than in the first driving mode, the vehicle is controlled in the second driving mode, and the driving mode is changed to the first driving mode when an abnormality including predetermined conditions has occurred regarding one or more cameras capturing an image of an area around the vehicle or an image captured by the one or more cameras.

Advantageous Effects of Invention

According to the aspects of the foregoing (1) to (11), a vehicle can be more appropriately controlled in accordance with a state of the vehicle.

BRIEF DESCRIPTION OF DRAWINGS

FIG. 2 is a view of a functional constitution of a first controller and a second controller.

FIG. 3 is a view showing an example of correspondences of driving modes, control states of a host vehicle, and tasks.

FIG. 5 is an explanatory view of connection states related to communication of a first control device 100, a multiview camera unit 90, and a memory device 96.

FIG. 6 is an explanatory view of conditions for judging an abnormality and estimated abnormalities.

FIG. 7 is an explanatory view of conditions for starting judgment of (1), (2), and (3) in FIG. 6.

FIG. 10 is an explanatory view of a management state of information acquired by each device.

FIG. 11 is an explanatory view of information related to save timings of recorded information and the save timings of information.

DESCRIPTION OF EMBODIMENT

Hereinafter, with reference to the drawings, an embodiment of a vehicle control device, a vehicle control method, and a program of the present invention will be described.

[Overall Constitution]

Figure 1:
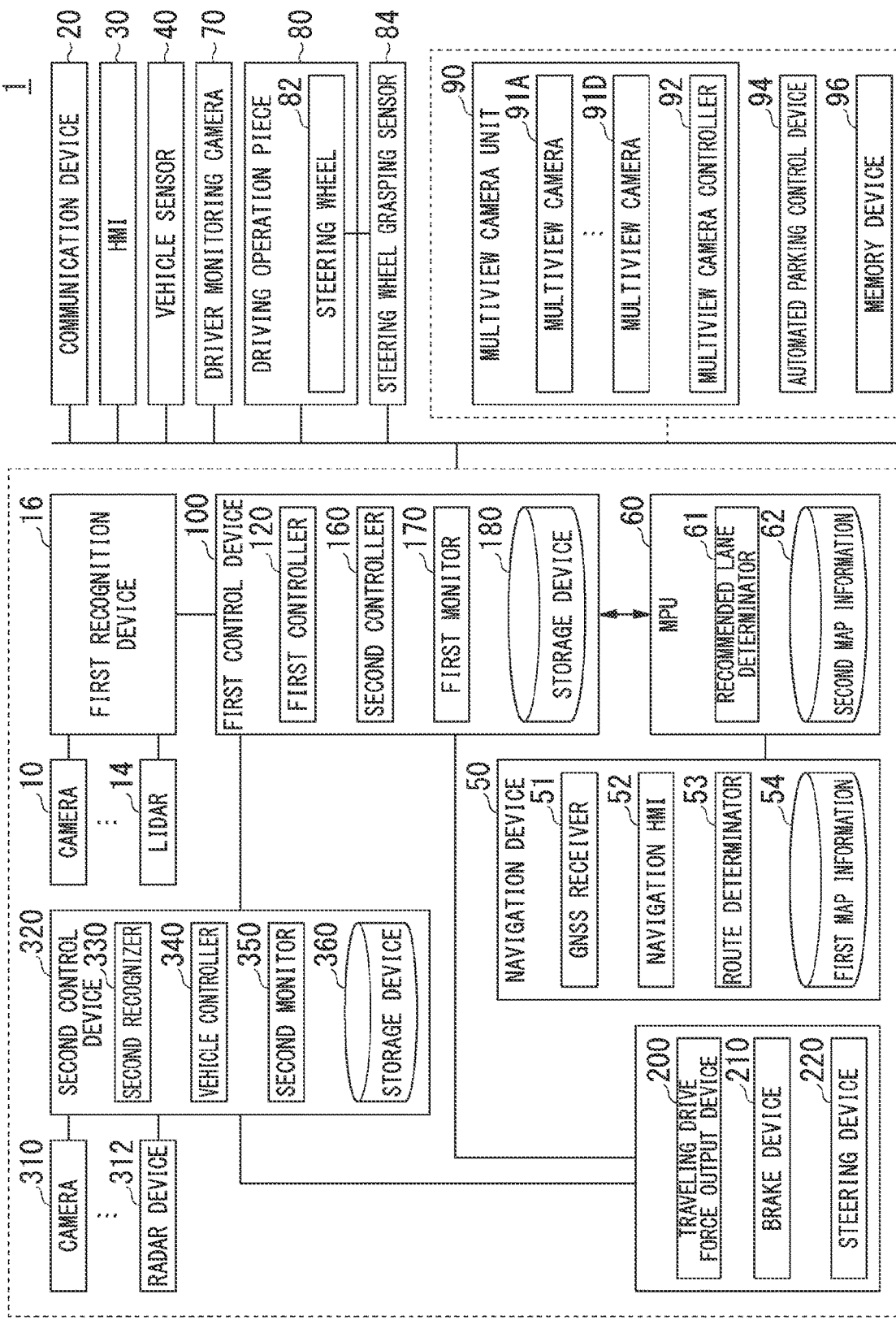
FIG. 1 is a view of a constitution of a vehicle system utilizing a vehicle control device according to an embodiment.

FIG. 1 is a view of a constitution of a vehicle system 1 utilizing a vehicle control device according to an embodiment. For example, a vehicle having the vehicle system 1 mounted therein is a vehicle having two wheels, three wheels, or four wheels, and a drive source thereof is an internal-combustion engine such as a diesel engine or a gasoline engine, an electric motor, or a combination of these. An electric motor operates using power generated by a generator interlinked to the internal-combustion engine, or discharge power of a secondary battery or a fuel cell. In the following description, a vehicle will be described as a four-wheeled hybrid vehicle having an internal-combustion engine and an electric motor as driving sources.

In the vehicle system 1, functions for controlling the vehicle are multiplexed or made redundant in a first group and a second group which will be described below. Accordingly, the reliability of the vehicle system 1 is improved.

For example, the vehicle system 1 includes a camera 10, a light detection and ranging (LIDAR) 14, a first recognition device 16, a communication device 20, a human machine interface (HMI) 30, a vehicle sensor 40, a navigation device 50, a map positioning unit (MPU) 60, a driver monitoring camera 70, a driving operation piece 80, a multiview camera unit 90, an automated parking control device 94, a memory device 96, a first control device 100, a traveling drive force output device 200, a brake device 210, and a steering device 220.

Moreover, for example, the vehicle system 1 includes a camera 310, a radar device 312, and a second control device 320.

These devices and equipment are connected to each other through a multiplex communication line such as a controller area network (CAN) communication line, a serial communication line, a radio communication network, or the like. The constitutions shown in FIG. 1, and FIGS. 2 and 4 (which will be described below) are merely examples. A part of the constitutions may be omitted, and other constitutions may be added thereto. In addition, the connection forms of communication lines shown in FIG. 1, and FIGS. 4 and 5 (which will be described below) are merely examples, and the connection forms may be suitably changed. Moreover, the functional constitutions may be integrated or may be provided in a dispersed manner. The vehicle system 1 is sorted into functional constitutions included in the first group and functional constitutions included in the second group. Details of the first group and the second group will be described below (refer to FIG. 4). In addition, the vehicle system 1 includes, in addition to those shown in FIG. 1, for example, a sound navigation and ranging (SONAR) for detecting an object at a short distance, and the like. However, a depiction thereof will be omitted.

For example, the camera 10 is a digital camera utilizing a solid-state image capturing element such as a charge coupled device (CCD) or a complementary metal oxide semiconductor (CMOS). The camera 10 is attached to an arbitrary part in the vehicle having the vehicle system 1 mounted therein (hereinafter, a vehicle M). When images of the side in front thereof are captured, the camera 10 is attached to an upper portion in a front windshield, a rear surface of a rearview mirror, or the like. For example, the camera 10 periodically and repeatedly captures images of an area around the vehicle M. The camera 10 may be a stereo camera.

The LIDAR 14 emits light (or electromagnetic waves having wavelengths close to that of light) to the area around the vehicle M and measures scattered light. The LIDAR 14 determines the distance to a target on the basis of a time from light emission to light reception. For example, emitted light is pulsed laser light. The LIDAR 14 is attached to an arbitrary part in the vehicle M.

The first recognition device 16 recognizes a position, a kind, a speed, and the like of an object by performing sensor fusion processing with respect to detection results of some or all of the camera 10 and the LIDAR 14 and outputs recognition results to the first control device 100. The first recognition device 16 may output detection results of the camera 10 and the LIDAR 14 to the first control device 100 without any change. The first recognition device 16 may be omitted from the vehicle system 1. The first recognition device 16 may perform the sensor fusion processing further using detection results of the radar device 312.

For example, the communication device 20 communicates with other vehicles present in the area around the vehicle M utilizing a cellular network, a Wi-Fi network, Bluetooth (registered trademark), dedicated short range communication (DSRC), or the like, or communicates with various server devices via radio base stations.

The HMI 30 presents various kinds of information to an occupant of the vehicle M and receives an input operation performed by the occupant. The HMI 30 includes various display devices, a speaker, a buzzer, a touch panel, a switch, a key, and the like. The HMI 30 may include a predetermined outputter which is provided in a steering wheel and prompts the occupant to grasp the steering wheel, or a head up display (HUD).

The vehicle sensor 40 includes various sensors used for controlling the vehicle M, such as a vehicle speed sensor for detecting a speed of the vehicle M, an acceleration sensor for detecting an acceleration, a yaw rate sensor for detecting an angular velocity around a vertical axis, and an azimuth sensor for detecting a direction of the vehicle M.

For example, the navigation device 50 includes a global navigation satellite system (GNSS) receiver 51, a navigation HMI 52, and a route determinator 53. The navigation device 50 retains first map information 54 in a storage device such as a hard disk drive (HDD) or a flash memory. The GNSS receiver 51 identifies the position of the vehicle M on the basis of a signal received from a GNSS satellite. The position of the vehicle M may be identified or complemented by an inertial navigation system (INS) utilizing an output of the vehicle sensor 40. The navigation HMI 52 includes a display device, a speaker, a touch panel, a key, and the like. A part or the entirety of the navigation HMI 52 may be shared as the HMI 30 described above. For example, with reference to the first map information 54, the route determinator 53 determines a route from the position of the vehicle M (or an arbitrary input position) identified by the GNSS receiver 51 to a destination input by the occupant using the navigation HMI 52 (hereinafter, a route on the map). For example, the first map information 54 is information in which road shapes are expressed by links indicating roads and nodes connected to each other by the links. The first map information 54 may include curvatures of roads, information of point of interest (POI), and the like. The route on the map is output to the MPU 60. The navigation device 50 may perform route guiding using the navigation HMI 52 on the basis of the route on the map. For example, the navigation device 50 may be realized by a function of a terminal device such as a smartphone or a tablet terminal carried by the occupant. The navigation device 50 may transmit a current position and a destination to a navigation server via the communication device 20 and acquire a route equivalent to the route on the map from the navigation server.

For example, the MPU 60 includes a recommended lane determinator 61 and retains second map information 62 in a storage device such as an HDD or a flash memory. The recommended lane determinator 61 divides a route on the map provided from the navigation device 50 into a plurality of blocks (for example, divides a route on the map by 100 [m] in a vehicle forward traveling direction) and determines a recommended lane for each block with reference to the second map information 62. The recommended lane determinator 61 determines which lane from the left to travel. When a branch point is present in the route on the map, the recommended lane determinator 61 determines a recommended lane such that the vehicle M can travel in a reasonable route for traveling forward to a branch location. In addition, the MPU 60 recognizes the position of the vehicle M on the basis of detection results of a gyro sensor (not shown), the position of the vehicle M identified by the GNSS receiver 51, and the like.

The second map information 62 is more detailed map information than the first map information 54. For example, the second map information 62 includes information of the centers of lanes, information of boundaries of lanes, and the like. In addition, the second map information 62 may include road information, traffic regulation information, address information (addresses and zip codes), facility information, phone number information, and the like. The second map information 62 may be updated at any time by the communication device 20 through communication with other devices.

Information indicating positions or ranges of zebra zones (buffer zones) is stored in the second map information 62. Zebra zones are road signs for inducing traveling of the vehicle M. For example, zebra zones are signs expressed by a stripe pattern.

For example, the driver monitoring camera 70 is a digital camera utilizing a solid-state image capturing element such as a CCD or a CMOS. The driver monitoring camera 70 is attached to an arbitrary part in the vehicle M in a position and a direction in which an image of the head of the occupant (hereinafter, the driver) seated in a driver's seat of the vehicle M can be captured from the front (in a direction in which an image of the face is captured). For example, the driver monitoring camera 70 is attached to an upper portion of the display device provided in a central portion of an instrument panel of the vehicle M.

For example, in addition to a steering wheel 82, the driving operation piece 80 includes an accelerator pedal, a brake pedal, a shift lever, and other operation pieces. A sensor for detecting an operation amount or the presence or absence of an operation is attached to the driving operation piece 80, and detection results thereof are output to the first control device 100 and the second control device 320, or some or all of the traveling drive force output device 200, the brake device 210, and the steering device 220. A steering wheel grasping sensor 84 is attached to the steering wheel 82. The steering wheel grasping sensor 84 is realized by an electrostatic capacity sensor or the like and outputs a signal capable of detecting whether or not the driver is grasping the steering wheel 82 (is in contact with the steering wheel 82 in a state in which a force can be applied thereto) to the first control device 100 or the second control device 320.

The multiview camera unit 90 includes multiview cameras 91A to 91D and a multiview camera controller 92. For example, the multiview cameras 91A to 91D (an example of "cameras" or "first cameras") are provided in the front, the rear, a side mirror on the right side, and a side mirror on the left side of the vehicle M, respectively. The multiview camera 91 provided in the front captures images on the side in front of the vehicle M (or views on the side in front thereof), the multiview camera 91 provided in the rear captures images on the side behind the vehicle M (or views on the side behind), the multiview camera 91 provided in the side mirror on the right side captures images in the right direction of the vehicle M (views in the right direction), and the multiview camera 91 provided in the side mirror on the left side captures images in the left direction of the vehicle M (views in the left direction). For example, the multiview cameras 91 capture images of regions up to a range of several centimeters to several meters from the vehicle M, regions unlikely to be visually recognized from the driver seated in the driver's seat, and regions at dead angles. A display inside a compartment displays the images captured by the multiview cameras 91A to 91D. The driver can recognize circumstances around the vehicle M with reference to the images captured by the multiview cameras 91A to 91D.

The multiview cameras 91A to 91D may be provided at four corners of the vehicle M. In addition, the multiview cameras 91 are not limited to four and may be five or more or three or fewer. The number of images (motion images) captured by the multiview cameras 91A to 91D is smaller than the number of pixels of images captured by the camera 10 (an example of "a second camera") or the camera 310 (another example of "the second camera"). Hereinafter, when the multiview cameras 91A to 91D are not distinguished from each other, they may be expressed as the multiview cameras 91.

The multiview camera controller 92 controls working states of the multiview cameras 91. For example, when predetermined conditions are satisfied, the multiview camera controller 92 causes the multiview cameras 91 to work, and the predetermined conditions are no longer satisfied, the multiview camera controller 92 stops the multiview cameras 91 from working. The predetermined conditions include that steering and acceleration/deceleration of the vehicle M are controlled by the first control device 100 (automated driving (which will be described below) is executed), the speed of the vehicle M is equal to or slower than a predetermined speed, the driver issues an instruction for causing the multiview cameras 91 to work, and the like. An instruction is an instruction for parking the vehicle M in a parking space utilizing assistance of the automated parking control device 94, or an instruction for causing the display inside the compartment to display images captured by the multiview cameras 91.

The multiview camera controller 92 makes a composite of images captured by the multiview cameras 91 and generates a composite image. A composite image is a composite of images captured by the multiview cameras 91 and images of the vehicle M captured in advance and is an image converted such that the vehicle M is simulatively viewed from directly above. A composite image may be generated by a different device instead of the multiview camera controller 92.

The multiview camera controller 92 provides images captured by the multiview cameras 91 to the memory device 96 and causes the memory device 96 to store the images. For example, the multiview camera controller 92 causes the memory device 96 to store images on the basis of an instruction of the first control device 100.

The automated parking control device 94 assists automated parking of the vehicle M in a predetermined parking space by controlling steering of the vehicle M. The automated parking control device 94 assists parking of the vehicle M using images captured by the multiview cameras 91. When the automated parking control device 94 performs automated parking of the vehicle M, the display inside the compartment displays images captured by the multiview cameras 91. The vehicle M is controlled such that the vehicle M is subjected to automated parking in a predetermined parking space. For example, the automated parking control device 94 generates a trajectory in which the vehicle M moves and controls steering of the vehicle M (or steering and acceleration/deceleration) along the generated trajectory such that the vehicle M is included in a predetermined parking area (for example, within a border line) using images acquired by the multiview cameras 91 (for example, composite images) or detection results of the SONAR (not shown). The automated parking control device 94 assists parking of the vehicle M.

For example, the memory device 96 is a device (a storage device including a non-transitory storage medium) such as an electrically erasable programmable read-only memory (EEPROM), a flash memory, or an HDD. The memory device 96 stores images provided by the multiview camera unit 90 in a storage domain. Images provided by the multiview camera unit 90 are "images of an external situation of the vehicle captured when the vehicle is controlled in at least the second driving mode", and the images are an example of images stored in the storage device as records of circumstances. These images are images used for understanding or verifying the circumstances afterward when the image has been captured (for example, images equivalent to images captured by a drive recorder).

For example, the first control device 100 includes a first controller 120, a second controller 160, a first monitor 170, and a storage device 180. For example, each of the first controller 120, the second controller 160, and the first monitor 170 is realized by a hardware processor such as a central processing unit (CPU) executing a program (software). Some or all of these constituent elements may be realized by hardware (a circuit; including circuitry) such as a large-scale integration (LSI), an application specific integrated circuit (ASIC), a field-programmable gate array (FPGA), or a graphics processing unit (GPU), or may be realized by software and hardware in cooperation. A program may be stored in the storage device 180 such as the EEPROM, the flash memory, or the HDD (a storage device including a non-transitory storage medium) of the first control device 100 in advance or may be stored in an attachable/detachable storage medium such as a DVD or a CD-ROM such that the program is installed in the HDD or the flash memory of the first control device 100 when the storage medium (non-transitory storage medium) is mounted in a drive device.

FIG. 2 is a view of a functional constitution of the first controller 120 and the second controller 160. For example, the first controller 120 includes a recognizer 130, an action plan generator 140, and a mode determinator 150. For example, the first controller 120 realizes a function based on artificial intelligence (AI) and a function based on a model given in advance in parallel. For example, the function of "recognition of an intersection" may be realized by executing recognition of an intersection based on deep learning or the like and recognition based on conditions given in advance (including signals allowing pattern matching, road signs, and the like) in parallel and scoring both for comprehensive evaluation. Accordingly, the reliability of automated driving is secured.

The recognizer 130 recognizes states of the position, the speed, the acceleration, and the like of an object in the area around the vehicle M on the basis of the information input from the camera 10 and the LIDAR 14 via the first recognition device 16. For example, the position of an object is recognized as a position on absolute coordinates having a representative point (the center of gravity, the center of a drive shaft, or the like) of the vehicle M as an origin and is used for control. The position of an object may be expressed by a representative point of the center of gravity of the object, a corner, or the like or may be expressed by a region. A "state" of an object may include an acceleration or a jerk of the object, or "an action state" (for example, whether or not a lane change is performed or attempted).

For example, the recognizer 130 recognizes a lane in which the vehicle M is traveling (traveling lane). For example, the recognizer 130 recognizes a traveling lane by comparing a pattern of road demarcation lines obtained from the second map information 62 (for example, an array of solid lines and dotted lines) with a pattern of road demarcation lines in the area around the vehicle M recognized from an image captured by the camera 10. The recognizer 130 may recognize a traveling lane by recognizing a course boundary (road boundary) including road demarcation lines, shoulders of a road, curbstones, median strips, guardrails, and the like, without being limited to road demarcation lines. In this recognition, the position of the vehicle M acquired from the navigation device 50 or processing results of the INS may be added. In addition, the recognizer 130 recognizes stop signs, obstacles, red signals, tollgates, and other road events.

When a traveling lane is recognized, the recognizer 130 recognizes a position or a posture of the vehicle M with respect to the traveling lane. For example, the recognizer 130 may recognize a discrepancy of a reference point in the vehicle M from the center of the lane and an angle formed with respect to a line obtained by connecting the centers of the lane in the forward traveling direction of the vehicle M as a relative position and a posture of the vehicle M with respect to the traveling lane. In place of this, the recognizer 130 may recognize the position of the reference point in the vehicle M or the like with respect to any side end portion of the traveling lane (a road demarcation line or a road boundary) as a relative position of the vehicle M with respect to the traveling lane.

In principle, the action plan generator 140 generates a target trajectory in which the vehicle M will automatically travel (without depending on an operation of the driver) in the future such that the vehicle M travels in a recommended lane determined by the recommended lane determinator 61 and can also cope with surrounding circumstances of the vehicle M. For example, a target trajectory includes a speed factor. For example, a target trajectory is expressed as arrival target points (trajectory points) of the vehicle M arranged in order. Trajectory points are arrival target points of the vehicle M for each predetermined traveling distance (for example, approximately several meters) by a distance along the road. In addition to this, a target speed and a target acceleration for each predetermined sampling time (for example, approximately several tenths of a second) are generated as a part of the target trajectory. In addition, the trajectory points may be arrival target positions of the vehicle M at corresponding sampling times of respective predetermined sampling times. In this case, information of the target speed and the target acceleration is expressed by an interval between the trajectory points.

When a target trajectory is generated, the action plan generator 140 may set an event of automated driving. An event of automated driving includes a constant speed traveling event, a low speed following traveling event, a lane change event, a branching event, a merging event, a takeover event, and the like. The action plan generator 140 generates a target trajectory corresponding to an activated event.

The mode determinator 150 determines any of a plurality of driving modes having different tasks imposed on the driver as a driving mode of the vehicle M. For example, the mode determinator 150 includes a driver state judger 152, a mode change processor 154, and an abnormality judger 156. Individual functions thereof will be described below.

FIG. 3 is a view showing an example of correspondences of driving modes, control states of the vehicle M, and tasks. For example, regarding the driving mode of the vehicle M, there are five modes including a mode A to a mode E. The control state, that is, the degree of automation in driving control of the vehicle M is the highest in the mode A, sequentially becomes lower in the order of the mode B, the mode C, and the mode D, and is the lowest in the mode E. On the contrary, tasks imposed on the driver are the least significant in the mode A, sequentially become more significant in the order of the mode B, the mode C, and the mode D, and are the most significant in the mode E. In the modes D and E, since the control state is not automated driving, the first control device 100 has a duty of ending control related to automated driving and shifting to driving assistance or manual driving. Hereinafter, details of each of the driving modes will be described as an example.

In the mode A, the vehicle M is in a state of automated driving, and both front side monitoring (or monitoring the area around the vehicle M) and grasping of the steering wheel 82 (in the diagram, steering wheel grasping) are not imposed on the driver. However, even in the mode A, the driver is required to be in a posture capable of quickly shifting to manual driving in response to a request from the system centered on the first control device 100. The aforementioned automated driving denotes that both steering and acceleration/deceleration are controlled without depending on an operation of the driver. The front side denotes a space visually recognized in the forward traveling direction of the vehicle M via the front windshield. For example, the mode A is a driving mode which can be executed on a motorway such as an expressway when the vehicle M is traveling at a predetermined speed (for example, approximately 50 [km/h]) or slower and conditions such as a preceding vehicle (following target) being present are satisfied, and it may also be referred to as a traffic jam pilot (TJP). When the conditions are no longer satisfied, the mode determinator 150 changes the driving mode of the vehicle M to the mode B.

In the mode B, the vehicle M is in a state of driving assistance, and a task of monitoring the side in front of the vehicle M (hereinafter, front side monitoring) is imposed (or monitoring of the area around the vehicle M is imposed) on the driver, but a task of grasping the steering wheel 82 is not imposed. In the mode C, the vehicle M is in a state of driving assistance, and the task of monitoring the side in front thereof and the task of grasping the steering wheel 82 are imposed on the driver. The mode D is a driving mode requiring a driving operation by the driver to a certain extent regarding at least one of steering and acceleration/deceleration of the vehicle M. For example, in the mode D, driving assistance such as adaptive cruise control (ACC) or a lane keeping assist system (LKAS) is performed. In the mode E, the vehicle M is in a state of manual driving requiring a driving operation by the driver for both steering and acceleration/deceleration. In both the mode D and the mode E, as a matter of course, the task of monitoring the side in front of the vehicle M is imposed on the driver. In each mode, in place of front side monitoring, surroundings monitoring may be imposed. The term "surroundings" denotes a space around the host vehicle M visually recognized by the driver at the time of manual driving. In the following description, it will be described on the assumption that "front side monitoring" is imposed.

The first control device 100 (and a driving assistance device (not shown)) executes automated lane change corresponding to the driving mode. Automated lane change includes automated lane change (1) based on a request of the system, and automated lane change (2) based on a request of the driver. The automated lane change (1) includes automated lane change for passing performed when the speed of a preceding vehicle is lower than a criterion compared to the speed of the host vehicle, and automated lane change for travelling forward toward a destination (automated lane change based on change of a recommended lane). In the automated lane change (2), lane change of the host vehicle M is performed in an operation direction when a direction indicator is operated by the driver in a case in which conditions related to the speed, the positional relationship with respect to surrounding vehicles, and the like are satisfied.

In the mode A, the first control device 100 executes neither of the automated lane changes (1) and (2). In the modes B and C, the first control device 100 executes both the automated lane changes (1) and (2). In the mode D, the driving assistance device (not shown) does not execute the automated lane change (1) but executes the automated lane change (2). In the mode E, neither of the automated lane changes (1) and (2) is executed.

When tasks related to a determined driving mode (hereinafter, a current driving mode) are not being executed by the driver, the mode determinator 150 changes the driving mode of the vehicle M to a driving mode having more significant tasks.

For example, in the mode A, when the driver is in a posture incapable of shifting to manual driving in response to a request from the system (for example, when the driver continues an action of looking aside other than an allowable area or when a sign indicating difficulty in performing driving is detected), the mode determinator 150 prompts the driver to shift to manual driving using the HMI 30 or the predetermined outputter prompting the occupant to grasp the steering wheel. If the driver does not comply therewith, the mode determinator 150 performs control such as pulling over the vehicle M to a shoulder of the road, gradually stopping the vehicle M, and stopping the automated driving. After automated driving is stopped, the vehicle M is in a state of the mode D or E, and the vehicle M can be started by a manual operation of the driver. Hereinafter, the same applies to the case regarding "stopping automated driving". In the mode B, when the driver is not monitoring the side in front thereof, the mode determinator 150 prompts the driver to monitor the side in front thereof using the HMI or the predetermined outputter. If the driver does not comply therewith, the mode determinator 150 performs control such as pulling over the vehicle M to a shoulder of the road, gradually stopping the vehicle M, and stopping the automated driving. In the mode C, when the driver is not monitoring the side in front thereof, or when the steering wheel 82 is not grasped, the mode determinator 150 prompts the driver to monitor the side in front thereof and/or to grasp the steering wheel 82 using the HMI 30 or the predetermined outputter. If the driver does not comply therewith, the mode determinator 150 performs control such as pulling over the vehicle M to a shoulder of the road, gradually stopping the vehicle M, and stopping the automated driving.

The driver state judger 152 monitors the state of the driver for the foregoing mode change and judges whether or not the state of the driver is a state corresponding to the task. For example, the driver state judger 152 performs posture estimation processing by analyzing an image captured by the driver monitoring camera 70 and judges whether or not the driver is in a posture incapable of shifting to manual driving in response to a request from the system. The driver state judger 152 performs visual line estimation processing by analyzing an image captured by the driver monitoring camera 70 and judges whether or not the driver is monitoring the side in front thereof.

The mode change processor 154 performs various kinds of processing for changing the mode. For example, the mode change processor 154 instructs the action plan generator 140 to generate a target trajectory for stopping at a shoulder of a road, instructs the driving assistance device (not shown) to operate, or controls the HMI 30 to prompt the driver to perform an action.

When the first control device 100 controls the vehicle M and an abnormality including predetermined conditions regarding one or more multiview cameras 91 (all or some of the multiview cameras 91A to 91D) capturing images of the area around the vehicle M (or surrounding views) such that the display inside the compartment displays the images or images captured by the multiview cameras 91A to 91D occurs (for example, when an abnormality occurs in processing of images captured by the multiview cameras 91A to 91D), the abnormality judger 156 changes the driving mode to the first driving mode to. Details thereof will be described below.

Description returns to FIG. 2. The second controller 160 controls the traveling drive force output device 200, the brake device 210, and the steering device 220 such that the vehicle M passes through a target trajectory generated by the action plan generator 140 as scheduled.

For example, the second controller 160 includes an acquirer 162, a speed controller 164, and a steering controller 166. The acquirer 162 acquires information of a target trajectory (trajectory points) generated by the action plan generator 140 and stores it in a memory (not shown). The speed controller 164 controls the traveling drive force output device 200 via a drive ECU 252 (which will be described below) and controls the brake device 210 via a brake ECU (260 or 362) on the basis of the speed factor associated with the target trajectory stored in the memory. The steering controller 166 controls the steering device 220 via a steering ECU (250 or 350) in accordance with a curve state of the target trajectory stored in the memory. For example, the processing of the speed controller 164 and the steering controller 166 is realized by a combination of feedforward control and feedback control. As an example, the steering controller 166 executes feedforward control in accordance with the curvature of the road in front of the vehicle M and feedback control based on a discrepancy from the target trajectory in combination. The foregoing speed controller 164 may be integrated with the drive ECU 252 or the brake ECU. The foregoing steering controller 166 may be integrated with the steering ECU. Details of the first monitor 170 will be described below.

Description returns to FIG. 1. The traveling drive force output device 200 outputs a traveling drive force (torque) allowing the vehicle M to travel to drive wheels. For example, the traveling drive force output device 200 is a combination of an internal-combustion engine, an electric motor, a transmission, and the like.

For example, the brake device 210 includes a brake caliper, a cylinder transmitting a hydraulic pressure to the brake caliper, and an electric motor causing the cylinder to generate a hydraulic pressure. The brake device 210 may include a mechanism, as a backup, in which a hydraulic pressure generated by an operation of the brake pedal included in the driving operation piece 80 is transmitted to the cylinder via a master cylinder. The brake device 210 is not limited to the constitution described above and may be an electronic control hydraulic brake device in which an actuator is controlled in accordance with the information input from the second controller 160 and a hydraulic pressure of the master cylinder is transmitted to the cylinder.

For example, the steering device 220 includes an electric motor. For example, the electric motor changes the direction of steered wheels by causing a force to act by a rack-and-pinion mechanism.

For example, for example, the camera 310 is a digital camera utilizing a solid-state image capturing element such as a CCD or a CMOS. The camera 310 is attached to an arbitrary part in the vehicle M. For example, the camera 310 periodically and repeatedly captures images of the area around the vehicle M. The camera 10 may be a stereo camera.

The radar device 312 radiates radio waves such as millimeter waves in the area around the vehicle M and detects at least a position of an object (a distance and an azimuth) by detecting radio waves (reflected waves) reflected by the object. The radar device 312 is attached to an arbitrary part in the vehicle M. The radar device 312 may detect a position and a speed of an object by a frequency modulated continuous wave (FM-CW) method.

For example, the second control device 320 includes a second recognizer 330, a vehicle controller 340, a second monitor 342, and a storage device 360. For example, the second recognizer 330, the vehicle controller 340, and the second monitor 342 are realized by a hardware processor such as a CPU executing a program (software). Some or all of these constituent elements may be realized by hardware (a circuit; including circuitry) such as an LSI, an ASIC, an FPGA, or a GPU, or may be realized by software and hardware in cooperation. A program may be stored in the storage device 360 such as the EEPROM, the flash memory, or the HDD (a storage device including a non-transitory storage medium) of the second control device 320 in advance or may be stored in an attachable/detachable storage medium such as a DVD or a CD-ROM such that the program is installed in the HDD or the flash memory of the second control device 320 when the storage medium (non-transitory storage medium) is mounted in the drive device.

The second recognizer 330 recognizes a position, a kind, a speed, and the like of an object by performing sensor fusion processing with respect to detection results of some or all of the camera 310 and the radar device 312.

The vehicle controller 340 executes automated driving of the vehicle M by executing processing similar to those of the first controller 120 and the second controller 160. However, the processing performance of the first controller 120 and the second controller 160 (the first control device 100) is higher than the processing performance of the vehicle controller 340 (the second control device 320). The reliability of the processing performance of the first controller 120 and the second controller 160 is higher than the reliability of the processing performance of the vehicle controller 340. For this reason, automated driving performed by the first controller 120 and the second controller 160 is smoother than automated driving performed by the vehicle controller 340. Details of the second monitor 342 will be described below.

[First Group and Second Group]

Figure 4:
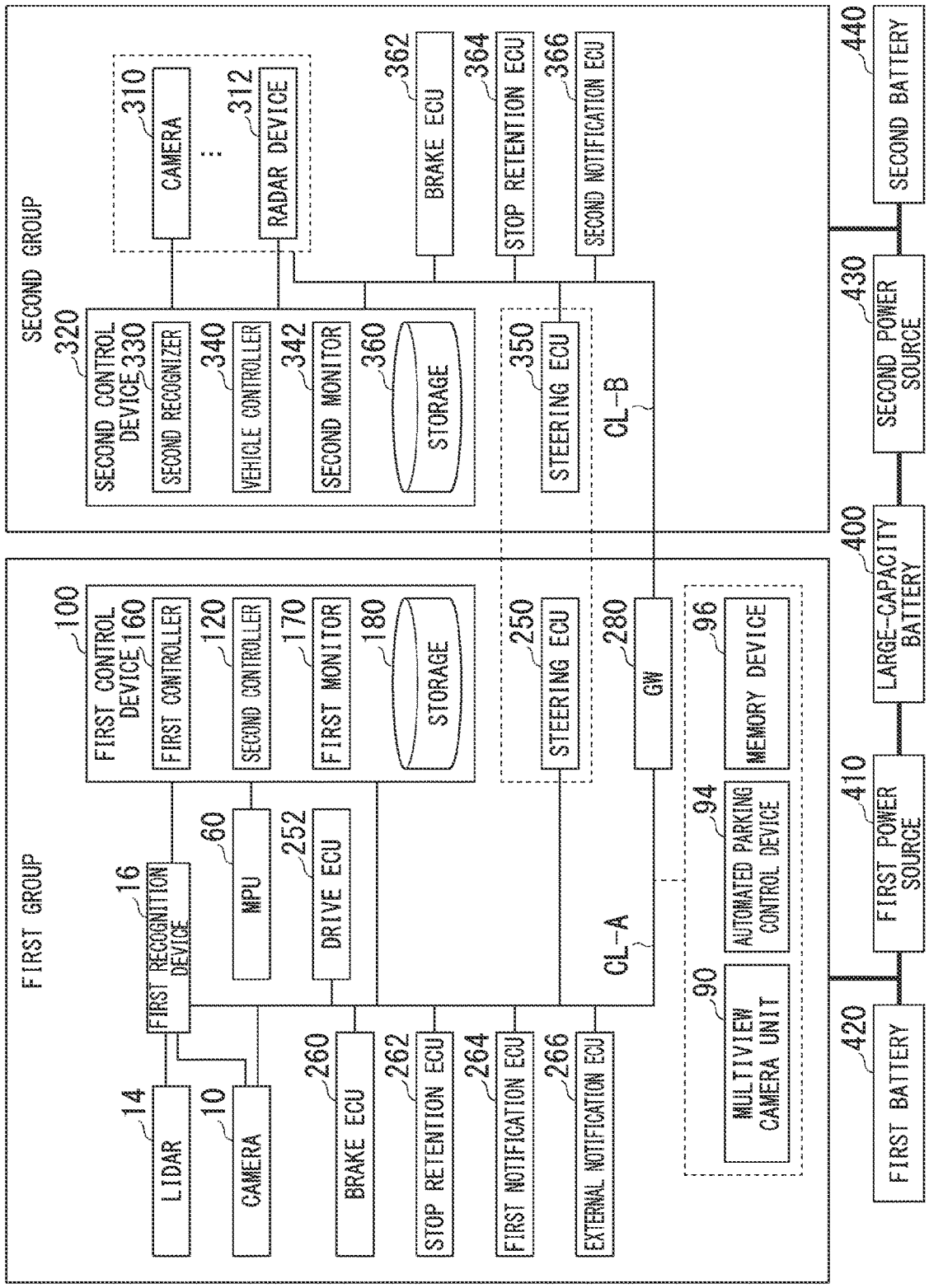
FIG. 4 is a view showing a vehicle system 1 from another point of view.

FIG. 4 is a view showing the vehicle system 1 from another point of view. With reference to FIG. 4, the first group and the second group will be described. Description of the functional constitutions which have been described in FIGS. 1 and 2 will be omitted.

(First Group)

The camera 10, the LIDAR 14, the first recognition device 16, the MPU 60, the first control device 100, a steering electronic control unit (ECU) 250, the drive ECU 252, the brake ECU 260, a stop retention ECU 262, a first notification ECU 264, the multiview camera unit 90, the automated parking control device 94, the memory device 96, and a GW 280 are included in the first group, for example. The functional constitutions included in the first group can communicate with each other.

The steering ECU 250 controls the steering device 220 in association with the first control device 100. The steering ECU 250 changes the direction of the steered wheels by driving the electric motor in accordance with the information input from the second controller 160. The steering ECU 250 controls steering in accordance with an operation of the driver with respect to the steering wheel. The steering ECU 250 controls steering using information input from an electric motor outputting a drive force for steering, a sensor for detecting an amount of rotation of the electric motor, or a torque sensor for detecting a steering torque, or provides these pieces of information to the second controller 160.

The drive ECU 252 controls the traveling drive force output device 200 in association with the first control device 100. The drive ECU 252 controls the traveling drive force output device 200 in accordance with the information input from a sensor provided in the driving operation piece 80. For example, the drive ECU 252 controls the internal-combustion engine or the electric motor or switches a gear stage of an automatic transmission on the basis of the amount of operation of the accelerator pedal, the amount of operation of the brake pedal, or information input from a sensor for detecting the vehicle speed.

The brake ECU 260 controls the brake device 210 in association with the first control device 100. The brake ECU 260 controls the electric motor in accordance with the information input from the second controller 160 such that a brake torque corresponding to a braking operation is output to each wheel. For example, the brake ECU 260 and the brake device 210 function as an electric servo brake (ESB). For example, the brake ECU 260 controls a distribution of a braking force by the brake device 210 and a braking force from regenerative braking of the electric motor.

The stop retention ECU 262 controls an electric parking lock device provided in the automatic transmission. For example, when a P range (parking range) is selected, the electric parking lock device locks an internal mechanism of the automatic transmission.

The first notification ECU 264 controls an in-vehicle outputter notifying the inside of the vehicle of information. For example, the in-vehicle outputter includes an outputter provided in the steering wheel. For example, this outputter is turned on when there is a need for the occupant of the vehicle M to grasp the steering wheel. In addition, the in-vehicle outputter also includes a mechanism for prompting the occupant to grasp the steering wheel or perform a predetermined operation by vibrating a seatbelt.

The GW 280 relays a communication line CL-A and a communication line CL-B. For example, the camera 10, the first recognition device 16, the first control device 100, the drive ECU 252, the brake ECU 260, the stop retention ECU 262, the first notification ECU 264, an external notification ECU 266, the multiview camera unit 90, and the like are connected to the communication line CL-A. For example, the camera 310, the radar device 312, the second control device 320, the steering ECU 350, the brake ECU 362, a stop retention ECU 364, and a second notification ECU 366 are connected to the communication line CL-B.

(Second Group)

The steering wheel grasping sensor 84, the camera 310, the LIDAR 312, the second control device 320, the steering ECU 350, the brake ECU 362, the stop retention ECU 364, and the steering wheel grasping sensor 84 are included in the second group, for example. The functional constitutions included in the second group can communicate with each other.

The steering ECU 350 controls the steering device 220 in association with a second control device 300. The steering ECU 250 controls steering using information input from the electric motor outputting a drive force for steering, the sensor for detecting the amount of rotation of the electric motor, or the torque sensor for detecting a steering torque.

The brake ECU 362 controls the brake device 210 in association with the second control device 300. The brake ECU 362 controls the electric motor in accordance with the information input from the vehicle controller 340 such that a brake torque corresponding to a braking operation is output to each wheel. The brake ECU 362 realizes vehicle stability assist (VSA). The brake ECU 362 curbs occurrence of skidding due to the wheels locked when braked suddenly or braked on a low-friction road on the basis of detection results of the yaw rate sensor or the acceleration sensor, curbs wheel slip with no traction at the time of starting or at the time of stopping, and also curbs occurrence of sideslip by controlling the posture of the vehicle M at the time of turning.

The stop retention ECU 364 maintains a stopped state of the vehicle M by controlling an electric parking brake (EPB). The electric parking brake has a mechanism for locking the rear wheels. The stop retention ECU 364 locks or unlocks the rear wheels by controlling the electric parking brake.

[First Monitor and Second Monitor]

The first monitor 170 monitors the states of some or all of the functional constitutions (devices having the functional constitutions) included in the second group connected thereto via the GW 280. For example, the first monitor 170 acquires information transmitted from a communication counterpart device and judges whether or not an abnormality is present in the communication counterpart device on the basis of the acquired information. For example, a state in which an abnormality is present indicates a state in which a communication counterpart device cannot be controlled in a state intended by the second control device 320. For example, a state in which an abnormality is present includes a flaw of a device, a functional flaw of a device, functional deterioration, a state in which communication with a device differs from a criterion communication state, and the like. Information transmitted by the communication counterpart device is results of self-diagnosis of the connection counterpart device or a predetermined flag transmitted from the connection counterpart device. For example, when results of self-diagnosis indicating an abnormality or information including a flag indicating an abnormality is transmitted from the connection counterpart device, the first monitor 170 judges that an abnormality is present in the communication counterpart device. In addition, when in a state in which communication with the connection counterpart device cannot be performed or a state in which communication is delayed, the first monitor 170 may judge that there is an abnormality in the communication counterpart device.

The second monitor 342 monitors the states of some or all of the functional constitutions included in the first group connected thereto via the GW 280. The second monitor 342 acquires information transmitted from a communication counterpart device and judges whether or not an abnormality is present in the communication counterpart device on the basis of the acquired information. For example, a state in which an abnormality is present indicates a state in which a communication counterpart device cannot be controlled in a state intended by the first control device 100. For example, a state in which an abnormality is present includes a flaw of a device, a functional flaw of a device, functional deterioration, a state in which communication with a device differs from a criterion communication state, and the like. For example, a state in which a communication counterpart device is abnormal includes a state similar to the state which has been described in description of the first monitor 170.

When an abnormality occurs in the equipment or the devices included in the first group, the second control device 320 executes automated driving in place of the first control device 100. For example, when an abnormality has occurred in the steering ECU 250, the brake ECU 260, and the stop retention ECU 262 of the equipment or the devices included in the first group or in the equipment or the device which is a control target of these, the second control device 320 executes automated driving by controlling the steering ECU 350, the brake ECU 362, the stop retention ECU 364, or the equipment or the device which is a control target of these. For example, automated driving in this case is automated driving in a fail operation function (FOF) mode (degeneration control mode). The FOF mode is a mode in which the vehicle system 1 requests manual operation of the vehicle M from the driver and performs control for a predetermined time (or a predetermined distance) such that the vehicle M does not deviate from the road and the vehicle M does not come excessively close to surrounding vehicles. When a manual operation is not performed for a predetermined time, the vehicle system 1 stops the vehicle M as it is by decelerating the vehicle M or stops the vehicle M at a position where it can stop.

[Power Source]

Moreover, for example, the vehicle system 1 includes a large-capacity battery 400, a first power source 410, a first battery 420, a second power source 430, and a second battery 440.

For example, the large-capacity battery 400 is a chargeable/dischargeable battery such as a lithium-ion battery. An electric motor for driving is driven by power supplied from the large-capacity battery 400. The large-capacity battery 400 is charged with regenerative power generated by the electric motor.

The first power source 410 reduces an output voltage of the large-capacity battery 400 and supplies power of the large-capacity battery 400 to each of the functional constitutions of the first group. For example, the first battery 420 is a 12 V lead battery. For example, when power is not supplied from the large-capacity battery 400 to a functional constitution of the first group, power of the first battery 420 is supplied to a functional constitution of the first group. In addition, the first battery 420 supplies power to the navigation device 50, the communication device 20, the driver monitoring camera 70, and some of the sensors included in the vehicle sensor 40.

The second power source 430 reduces an output voltage of the large-capacity battery 400 and supplies power of the large-capacity battery 400 to each of the functional constitutions of the second group. For example, the second battery 440 is a 12 V lead battery. For example, when power is not supplied from the large-capacity battery 400 to a functional constitution of the second group, power of the second battery 440 is supplied to a functional constitution of the second group. In addition, the second battery 440 supplies power to the steering wheel grasping sensor 84 and some of the sensors included in the vehicle sensor 40.

[Abnormality Related to Multiview Camera Unit or Memory Device]

FIG. 5 is an explanatory view of connection states related to communication of the first control device 100, the multiview camera unit 90, and the memory device 96. The first control device 100 and the multiview camera unit 90 are connected via the communication line CL-A. The multiview camera unit 90 and the memory device 96 are connected via a communication line CL-C.

A communication speed of communication performed using the communication line CL-A (the communication line CL-B) is higher than a communication speed of communication performed using the communication line CL-C. Between the devices to which the communication line CL-A (the communication line CL-B) is connected, communication using so-called F-CAN is performed. Between the devices to which the communication line CL-C is connected, communication using so-called B-CAN is performed.

In the example of FIG. 5, one or more other devices may be interposed between the first control device 100 and the multiview camera unit 90 or between the multiview camera unit 90 and the memory device 96. The memory device 96 may communicate with the first control device 100 without going through the multiview camera unit 90.

When the following judgment conditions are satisfied, the abnormality judger 156 judges that an abnormality (an abnormality including the predetermined conditions) has occurred in the multiview cameras 91 or processing of images captured by the multiview cameras 91. Hereinafter, details thereof will be described.

FIG. 6 is an explanatory view of conditions for judging an abnormality and estimated abnormalities.

(1) When the abnormality judger 156 receives information indicating that video image data cannot be output from the multiview camera unit 90 and this state (a state in which the first control device 100 cannot acquire an image) has continued for a first time (for example, 5 [s]), it is estimated that a failure has occurred in the multiview camera unit 90. An abnormality of the multiview camera unit 90 is an internal failure of the multiview camera unit 90, a flaw of a video image signal, or the like.

(2) When the abnormality judger 156 receives information indicating that video recording cannot be performed from the multiview camera unit 90 or the memory device 96 and this state (a state in which an image cannot be video-recorded) has continued for a second time (for example, 18 [s]), it is estimated that a failure has occurred in the multiview camera unit 90, the memory device 96, or the first control device 100.

(3) When a state in which video recording is not performed by the memory device 96 has continued for a third time (for example, 18 [s]) even though the first control device 100 has issued an instruction for video recording of video image data to the multiview camera controller 92 and the memory device 96, the abnormality judger 156 estimates that a failure similar to that of the foregoing (2) has occurred. For example, when driving in a predetermined driving mode (for example, the mode A) is started, the first control device 100 issues an instruction for video recording of video image data to the memory device 96.

FIG. 7 is an explanatory view of conditions for starting judgment of (1), (2), and (3) in FIG. 6. The judgment of (1), (2), and (3) in FIG. 7 starts when all the following conditions (a) to (d) are satisfied.

(a) The vehicle system 1 has shifted from a halt state to an activation state. For example, accessories (ACC power source) are shifted to an on-state, or an ignition switch (the driving source of the vehicle M) is shifted to an on-state.

(b) A voltage of the first battery 420 is equal to or higher than a first voltage (10 [V]).

(c) Setting for recording video images of the multiview camera unit 90 is effective. For example, when a predetermined driving mode (for example, the mode A) is started, the first control device 100 instructs the multiview camera unit 90 to start video recording of video images. Accordingly, setting for storing video images becomes effective. When execution of a predetermined driving mode (for example, the mode A) ends, the first control device 100 instructs the multiview camera unit 90 to end video recording of video images. Accordingly, setting for storing video images becomes ineffective.

(d) The first control device 100 and the multiview cameras 91 are in a state in which communication can be performed therebetween.

[Flowchart (1)]

Figure 8:
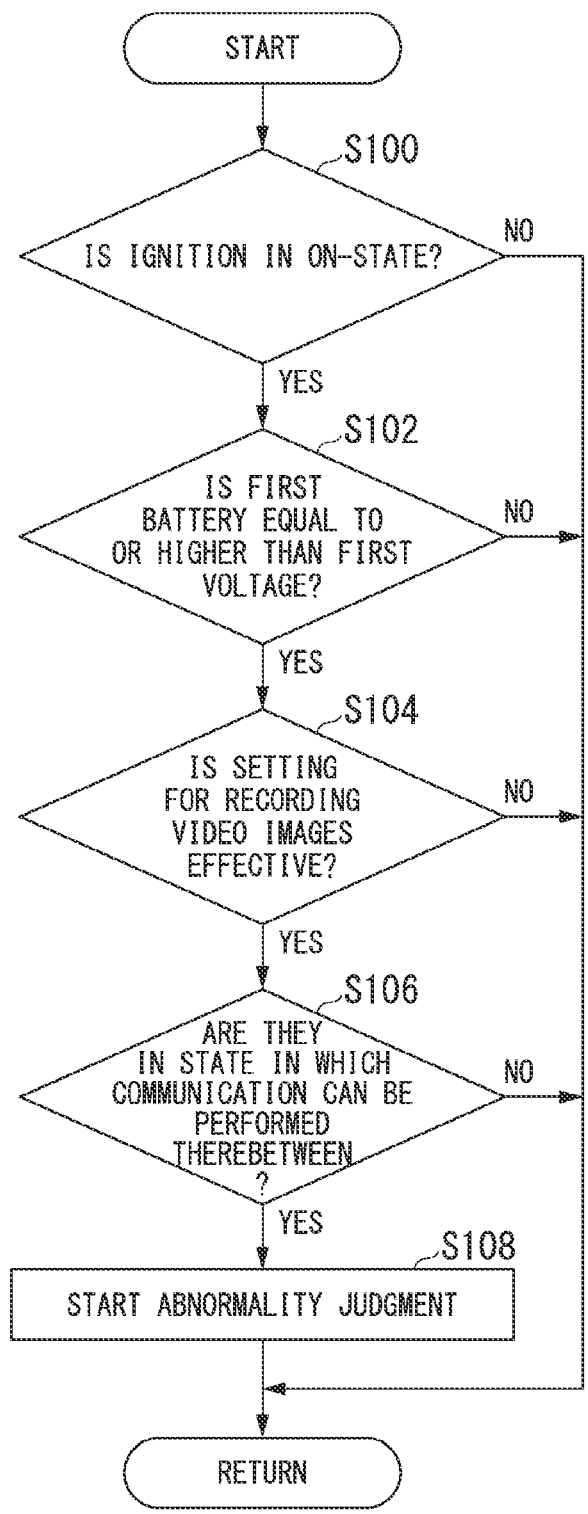
FIG. 8 is a flowchart showing an example of a flow of processing executed by an abnormality judger 156 of the first control device 100.

FIG. 8 is a flowchart showing an example of a flow of processing executed by the abnormality judger 156 of the first control device 100. For example, this processing is started when the power source of the vehicle M is in an on-state.

First, the abnormality judger 156 judges whether or not the ignition switch is in an on-state (Step S100). In Step S100, it may be judged whether or not accessories are in an on-state (or the vehicle system 1 is in an on-state). When the ignition switch is in an on-state, the abnormality judger 156 judges whether or not the voltage of the first battery 420 is equal to or higher than the first voltage (Step S102). When the voltage of the first battery 420 is equal to or higher than the first voltage, the abnormality judger 156 judges whether or not setting for recording video images is effective (Step S104).

When setting for recording video images is effective, the abnormality judger 156 judges whether or not the first control device 100 and the multiview camera unit 90 are in a state in which communication can be performed therebetween (Step S106). When the first control device 100 and the multiview camera unit 90 are in a state in which communication can be performed therebetween, the abnormality judger 156 starts abnormality judgment (Step S108). When the judgment in Step S100, S102, S104, or S106 is negative, one routine of this flowchart ends. The order of the processing of the foregoing Steps S100 to S106 may be changed.

Through the foregoing processing, it is possible to curb a situation in which the vehicle system 1 performs unnecessary judgment processing.

[Flowchart (2)]

Figure 9:
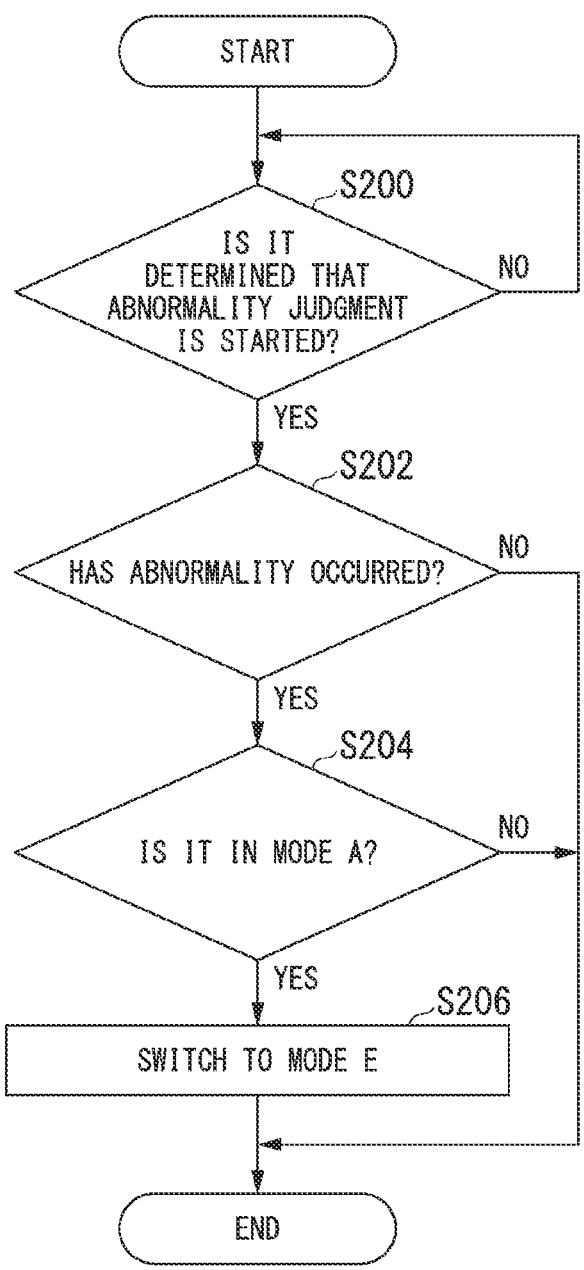
FIG. 9 is a flowchart showing an example of a flow of processing executed by a mode determinator 150.

FIG. 9 is a flowchart showing an example of a flow of processing executed by the mode determinator 150. First, the abnormality judger 156 judges whether or not it is determined that abnormality judgment is started (Step S200). When it is determined that abnormality judgment is started, the mode determinator 150 judges whether or not the abnormality judger 156 has judged that an abnormality has occurred in the multiview camera unit 90, the memory device 96, or communication between the multiview camera unit 90 and the first control device 100 (Step S202). When a judgment result of any of (1) to (3) in FIG. 6 is positive, the abnormality judger 156 judges that an abnormality has occurred therein.

When an abnormality has occurred, the mode change processor 154 judges whether or not the driving mode is the mode A (Step S204). When the driving mode is the mode A, the mode change processor 154 switches the driving mode to the mode E (Step S206). In this case, for example, the mode change processor 154 prompts the occupant of the vehicle M to perform a driving operation, and when the occupant performs a driving operation within a predetermined time, the mode change processor 154 switches the driving mode to the mode E. When the occupant does not perform a driving operation within a predetermined time, the first control device 100 more strongly prompts the occupant of the vehicle M to perform a driving operation, decelerates the vehicle M, or stops the vehicle M at a predetermined position.

When the judgment in Step S202 or S204 is negative, one routine of this flowchart ends.

Through the processing described above, the vehicle system 1 can more appropriately control the vehicle M when an abnormality has occurred.

In description of the foregoing example, if the driving mode is the mode A, it is switched to the mode E when an abnormality has occurred. However, in place of this, when the driving mode is a predetermined driving mode (the mode B or the like), the mode change processor 154 may switch it to the mode E. In addition, instead of switching it to the mode E, the mode change processor 154 may switch it to a different driving mode. A different driving mode is a driving mode more significant than the driving mode which has been subjected to judgment processing in Step S204.

[Management of Acquired Information]

FIG. 10 is an explanatory view of a management state of information acquired by each device.

(1) When automated driving in a predetermined driving mode (for example, the mode A) is started, the first control device 100 instructs the multiview camera unit 90 to start image capturing and instructs the memory device 96 to start video recording.

(2) The multiview camera unit 90 starts image capturing in response to the instruction, and the memory device 96 saves motion images captured by the multiview camera unit 90 in response to the instruction. The term "save" denotes that information is stored in the storage device so as not to be overwritten or deleted (information is stored regardless of a period). The term "record (which will be described below)" denotes that information is temporarily retained (information is retained for a predetermined time).

(3) If automated driving in a predetermined driving mode (for example, the mode A) is started, the first control device 100 records information obtained from the sensor included in the first group, or information related to a driving subject (manual driving, information of the driving modes, or information indicating which control device is performing control), and the recorded information is stored in the storage device 180. Further, this information is saved.

(4) The information stored (saved) in the foregoing (3) is provided to the second control device 300, and the same information is stored in the storage device 360 of the second control device 300 (data is subjected to mirroring and saved). For example, even when a situation in which power is not supplied to the first group or information is not stored in the storage device 180 of the first control device 100 occurs, since data is subjected to mirroring so that information is reliably saved.

(5) When the predetermined conditions are satisfied, the second control device 300 stores information obtained from the sensor included in the second group, or information related to a driving subject (information indicating which control device is performing control), and the stored information is stored in the storage device 360. For example, the predetermined conditions include that the first control device 100 has started automated driving in a predetermined driving mode (for example, the mode A), and the second control device 300 has executed a predetermined control (for example, has controlled the vehicle M on behalf of the first control device 100). The information acquired in the foregoing (5) is stored and saved in the storage device 360.

Save timing information related to a save timing of recorded information is output from an airbag device (SRS; supplemental restraint system) or the like. The save timing information is information indicating that an airbag has been deployed, or the degree of change in the vehicle speed or the acceleration has become equal to or higher than a reference value.

FIG. 11 is an explanatory view of information related to save timings of recorded information and the save timings of information. Hereinafter, a timing at which driving assistance or automated driving is started will be referred to as "T1", a timing at which a predetermined driving mode (for example, the mode B or the mode A) is started will be referred to as "T2", a timing at which the driver grasps the steering wheel will be referred to as "T3", and a timing at which the save timing information is output will be referred to as "T4".

Various kinds of information are recorded (retained for a predetermined time) during the period from T1 to T4, and various kinds of information are saved at T4. For example, various kinds of information include object data acquired by the vehicle M, a driving state (an operation with respect to the operation piece), the position of the vehicle M, date and time, and the traveling state of the vehicle M (various kinds of information such as information acquired by the sensor). For example, various kinds of information are information obtained in (3) of FIG. 10 described above.

The driving subject (information indicating automated driving or manual driving), date and time at each of the timings, and information of a place at each of the timings are saved at each of the timings T1, T2, and T3. For example, this information is information obtained in (3) of FIG. 10 described above.

Motion images captured by the multiview camera unit 90 are stored during a period from T2 to T4 (from T2 to T4 and after T4).

As described above, since various kinds of information are stored and saved, when the save timing information is output, information of the vehicle, the driver, and the area around the vehicle before the save timing information is output is obtained. This information is utilized when a cause or the like of the output of the save timing information is confirmed.

As described above, in a state in which a motion image which should be originally recorded is not recorded, the first control device 100 changes the driving mode to the first driving mode. The first control device 100 can more appropriately control the vehicle in accordance with the state of the vehicle.

According to the embodiment described above, when the first control device 100 controls the vehicle M in the second driving mode and an abnormality occurs in one or more cameras capturing images of the area around the vehicle M such that at least the display inside the compartment displays the images or processing of an image captured by one or more cameras, the vehicle can be more appropriately controlled in accordance with the state of the vehicle by changing the driving mode to the first driving mode.

The embodiment described above can be expressed as follows.

A vehicle control device is constituted to include a storage device storing a program and a hardware processor. When the hardware processor executes the program, surrounding circumstances of a vehicle are recognized, steering and acceleration/deceleration of the vehicle are controlled, and any of a plurality of driving modes including a first driving mode and a second driving mode is determined as a driving mode of the vehicle, in which tasks imposed on a driver in the second driving mode are less significant than in the first driving mode, the vehicle is controlled in the second driving mode, and the driving mode is changed to the first driving mode when an abnormality including predetermined conditions has occurred regarding one or more cameras capturing an image of an area around the vehicle or an image captured by the one or more cameras.

Hereinabove, a form for performing the present invention has been described using the embodiment. However, the present invention is not limited to such an embodiment at all, and various modifications and replacements can be added within a range not departing from the gist of the present invention.

REFERENCE SIGNS LIST

1 Vehicle system
10 Camera
16 First recognition device
20 Communication device
40 Vehicle sensor
50 Navigation device
70 Driver monitoring camera
80 Driving operation piece
82 Steering wheel
84 Steering wheel grasping sensor
90 Multiview camera unit
91A to 91D Multiview camera
94 Automated parking control device
96 Memory device
100 First control device
120 First controller
130 Recognizer
140 Action plan generator
150 Mode determinator
152 Driver state judger
154 Mode change processor
160 Second controller
162 Acquirer
164 Speed controller
166 Steering controller
170 First monitor
200 Traveling drive force output device
210 Brake device
220 Steering device
250 Steering ECU
252 Drive ECU
260 Brake ECU
262 Stop retention ECU
264 First notification ECU
266 External notification ECU
270 HUD
300 Second control device
310 Camera
312 Radar device
320 Second control device
330 Second recognizer
340 Vehicle controller
342 Second monitor
350 Steering ECU
350 Steering ECU
362 Brake ECU
364 Stop retention ECU
366 Second notification ECU
400 Large-capacity battery
410 First power source
420 First battery
430 Second power source
440 Second battery

What is claimed is:

1. A vehicle control device comprising:
one or more processors configured to:
recognize surrounding circumstances of a vehicle using a second image captured by a second camera without using a first image captured by one or more first cameras for capturing the first image which is displayed in a display to be visually recognized by a driver of the vehicle, wherein the one or more first cameras and the second camera are affixed to the vehicle,
control steering and acceleration/deceleration of the vehicle based on the surrounding circumstances of the vehicle,
determine one of a plurality of driving modes including a first driving mode and a second driving mode as a driving mode of the vehicle,
control the vehicle in the second driving mode in which a second number of driving tasks imposed on the driver in the second driving mode is less than a first number of driving tasks imposed on the driver in the first driving mode, and
transition from the second driving mode to the first driving mode in response to determining an occurrence of a first abnormality associated with a group of predetermined conditions in regard to the one or more first cameras capturing the first image of an area around the vehicle, or a second abnormality associated with the first image captured by the one or more first cameras,
wherein the first image captured by the one or more first cameras are images of an external situation of the vehicle captured when the vehicle is being controlled in at least the second driving mode, and the first image captured by the one or more first cameras is stored in a storage device as a record of the surrounding circumstances of the vehicle.

2. The vehicle control device according to claim 1,
wherein the second driving mode is a mode in which a first task of monitoring an area around the vehicle and a second task of grasping a steering wheel are not imposed on the driver, and
wherein the first driving mode is a mode in which the vehicle is controlled by a driving operation performed by the driver.

3. The vehicle control device according to claim 1, wherein the one or more first cameras capture a front image representing the surrounding circumstances in front of the vehicle, a rear image representing the surrounding circumstances behind the vehicle, of a right side image representing the surrounding circumstances on a right side of the vehicle, and a left side image representing the surrounding circumstances on a left side of the vehicle.

4. The vehicle control device according to claim 1, wherein the first abnormality represents:
   a first state in which the first image has not been captured by the one or more first cameras for a first time,
   a second state in which a video recording device recording the first image captured by the one or more first cameras is not able to video-record the first image captured by the one or more first cameras for a second time, or
   a third state in which the video recording device does not perform video recording for a third time in response to receiving, by the video recording device, an instruction to perform video recording of the first image.

5. The vehicle control device according to claim 4, wherein the second time or the third time is longer than the first time.

6. The vehicle control device according to claim 1, wherein the at least one processor is configured to:
   in response to a system of the vehicle having shifted from a halt state to an activation state, determine that the first abnormality of the group of predetermined conditions regarding the one or more first cameras is present, or that the first image captured by the one or more first cameras is present when a voltage of a battery mounted in the vehicle is a first voltage or higher, and determine that a setting value for video recording images captured by the first cameras is effective.

7. A vehicle control device comprising:
   at least one processor configured to:
      recognize surrounding circumstances of a vehicle using a second image captured by a second camera without using a first image captured by one or more first cameras for capturing the first image which is displayed in a display to be visually recognized by a driver of the vehicle, wherein the one or more first cameras and the second camera are affixed to the vehicle,
      control steering and acceleration/deceleration of the vehicle based on the surrounding circumstances of the vehicle,
      determine one of a plurality of driving modes including a first driving mode and a second driving mode as a driving mode of the vehicle,
      control the vehicle in the second driving mode in which a second number of driving tasks imposed on the driver in the second driving mode is less than a first number of driving tasks imposed on the driver in the first driving mode,
      transition from the second driving mode to the first driving mode in response to determining an occurrence of a first abnormality associated with a group of predetermined conditions in regard to the one or more first cameras capturing the first image of an area around the vehicle, or a second abnormality associated with the first image captured by the one or more first cameras, and
      perform automated parking of the vehicle in a predetermined parking space by controlling steering of the vehicle,
   wherein the first image captured by the one or more first cameras is displayed on the display when the automated parking of the vehicle is performed.

8. A vehicle control method in which a computer mounted in a vehicle:
   recognizes surrounding circumstances of the vehicle using a second image captured by a second camera without using a first image captured by one or more first cameras for capturing the first image which is displayed in a display to be visually recognized by a driver of the vehicle, wherein the one or more first cameras and the second camera are affixed to the vehicle,
   controls steering and acceleration/deceleration of the vehicle based on the surrounding circumstances of the vehicle,
   determines one of a plurality of driving modes including a first driving mode and a second driving mode as a driving mode of the vehicle,
   controls the vehicle in the second driving mode in which a second number of driving tasks imposed on the driver in the second driving mode is less than a first number of driving tasks imposed on the driver in the first driving mode, and
   transitions from the second driving mode to the first driving mode in response to determining an occurrence of a first abnormality associated with a group of predetermined conditions in regard to the one or more first cameras capturing the first image of an area around the vehicle, or a second abnormality associated with the first image captured by the one or more first cameras,
   wherein the first image captured by the one or more first cameras is the first image of an external situation of the vehicle captured when the vehicle is being controlled in at least the second driving mode, and the first image captured by the one ore more first cameras is stored in a storage device as a record of the surrounding circumstances of the vehicle.

* * * * *